(12) United States Patent
O'Connor

(10) Patent No.: US 7,357,398 B2
(45) Date of Patent: Apr. 15, 2008

(54) CART FOR WELDING OPERATIONS

(75) Inventor: James J. O'Connor, Jefferson, OH (US)

(73) Assignee: Lincoln Global, Inc., City of Industry, CA (US)

( * ) Notice: Subject to any disclaimer, the term of this patent is extended or adjusted under 35 U.S.C. 154(b) by 402 days.

(21) Appl. No.: 11/006,378

(22) Filed: Dec. 7, 2004

(65) Prior Publication Data
US 2006/0119059 A1 Jun. 8, 2006

(51) Int. Cl.
*B62B 3/02* (2006.01)
(52) U.S. Cl. .............. 280/47.34; 280/47.35; 280/79.11; 280/79.2; 280/79.5; 280/79.6; 280/47.131
(58) Field of Classification Search .. 280/47.34–47.36, 280/47.131, 47.12, 79.2, 79.5, 79.6, 79.11, 280/33.991; 403/167, 168
See application file for complete search history.

(56) References Cited

U.S. PATENT DOCUMENTS

| | | | | |
|---|---|---|---|---|
| 1,896,249 A | * | 2/1933 | Russell | 280/47.35 |
| 2,583,196 A | * | 1/1952 | Zander et al. | 280/47.35 |
| 2,624,483 A | * | 1/1953 | Ketzel | 414/453 |
| 3,843,160 A | * | 10/1974 | Frushour et al. | 280/416.1 |
| 3,873,118 A | * | 3/1975 | Takagi | 280/47.2 |
| 4,171,172 A | * | 10/1979 | Johnston | 403/71 |
| 4,697,818 A | * | 10/1987 | Moore | 280/416.1 |
| D322,501 S | * | 12/1991 | Legault | D34/24 |
| 5,440,098 A | * | 8/1995 | Matus | 219/136 |
| 5,730,891 A | * | 3/1998 | Karpoff et al. | 219/136 |
| 6,116,623 A | * | 9/2000 | Salvucci | 280/47.26 |
| D432,283 S | * | 10/2000 | Mohns | D34/24 |
| 6,224,071 B1 | * | 5/2001 | Dummer | 280/47.2 |
| 6,354,758 B1 | * | 3/2002 | Chaulk | 403/102 |
| 6,371,496 B1 | * | 4/2002 | Balolia | 280/35 |
| 6,554,300 B1 | * | 4/2003 | Ziolkowski | 280/47.27 |
| 6,590,184 B1 | * | 7/2003 | Andersen | 219/136 |
| 6,663,136 B2 | * | 12/2003 | Stevens | 280/511 |
| 6,992,266 B1 | * | 1/2006 | Di Novo et al. | 219/137.9 |
| 7,114,732 B1 | * | 10/2006 | Ismail | 280/47.34 |

* cited by examiner

*Primary Examiner*—Christopher P. Ellis
*Assistant Examiner*—Vaughn T. Coolman
(74) *Attorney, Agent, or Firm*—Fay Sharpe LLP

(57) ABSTRACT

A cart for transporting items used in welding operations includes a platform, wheels, a handle and a connector. The platform is dimensioned such that an associated container of welding consumables can rest on the platform. The wheels connect to the platform to facilitate movement of the cart. The handle connects to and extends upwardly from the platform. The connector allows for selective connecting of the cart to an associated welding cart.

49 Claims, 11 Drawing Sheets

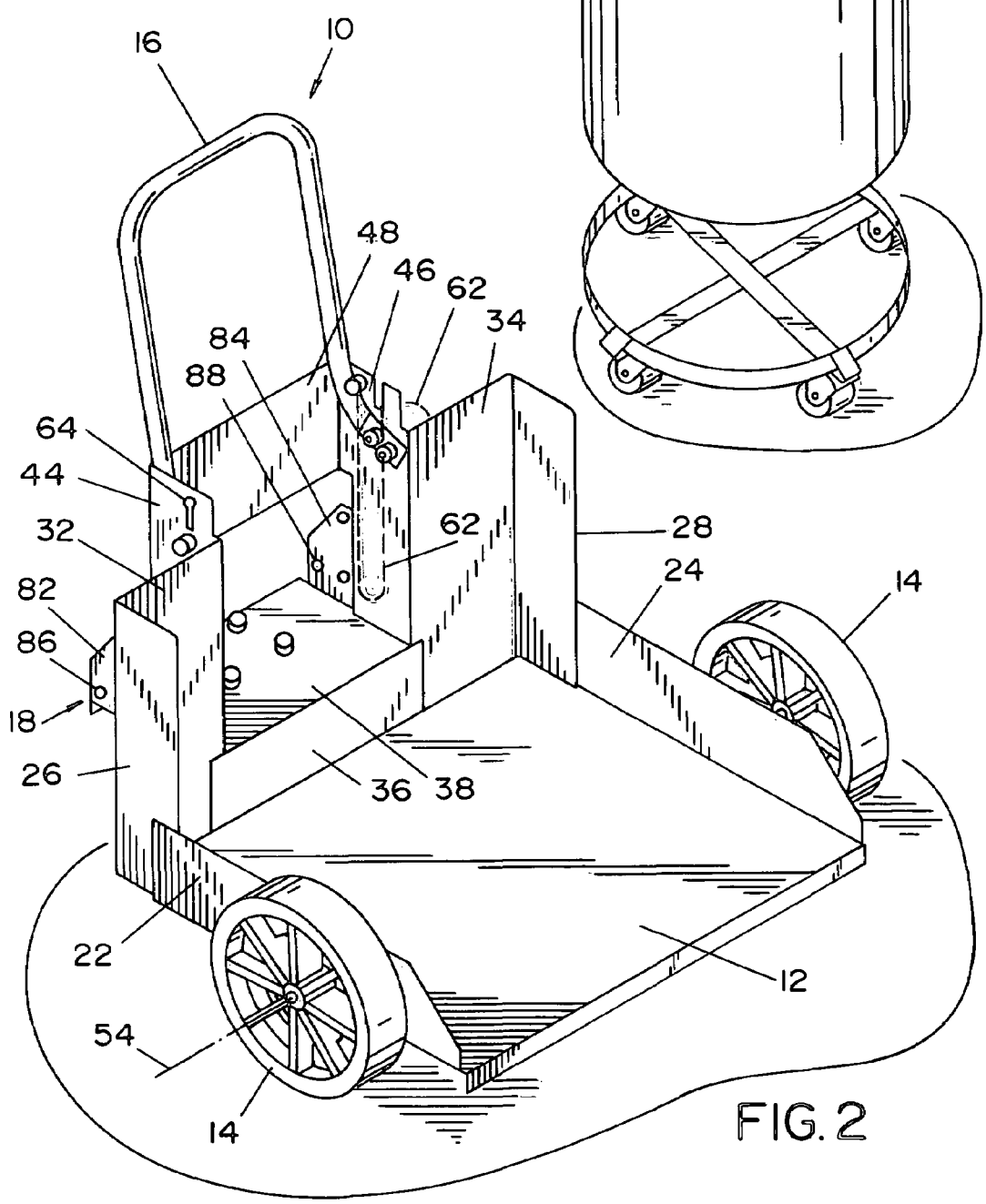

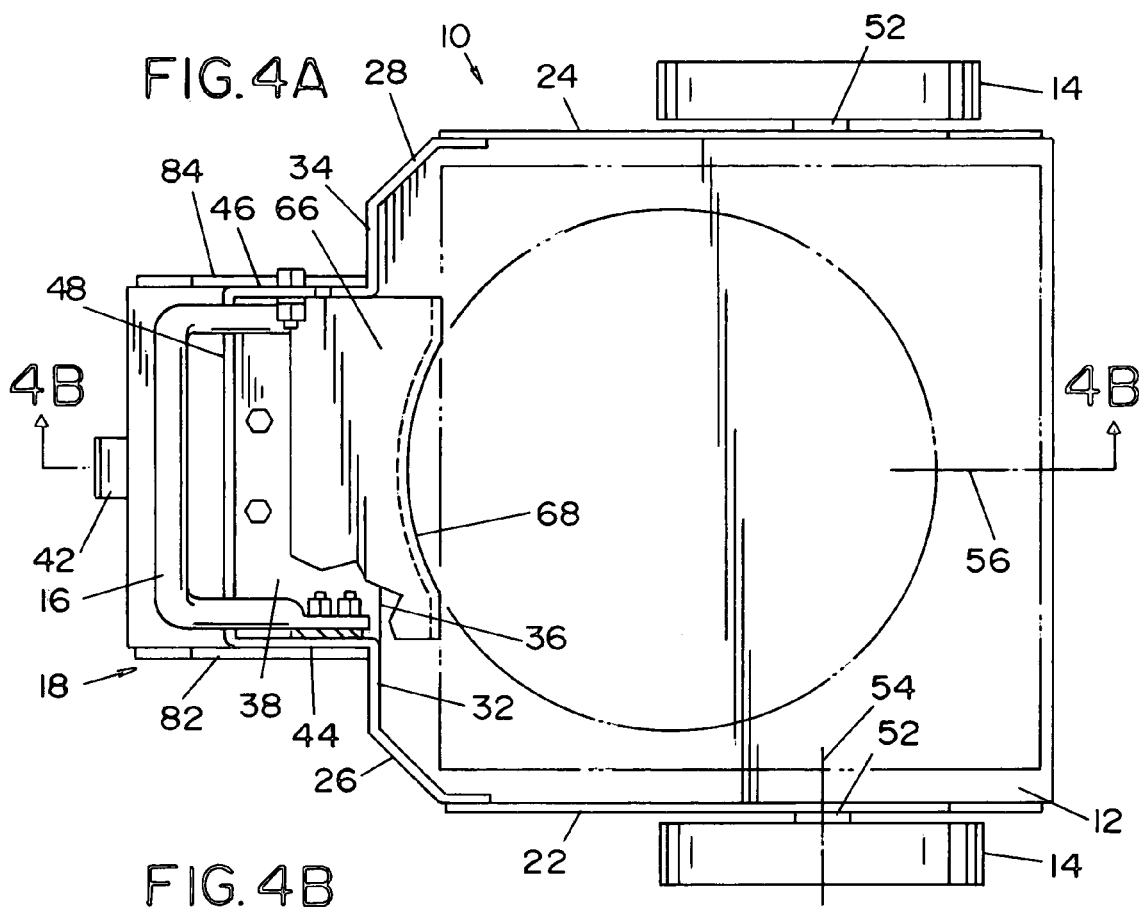
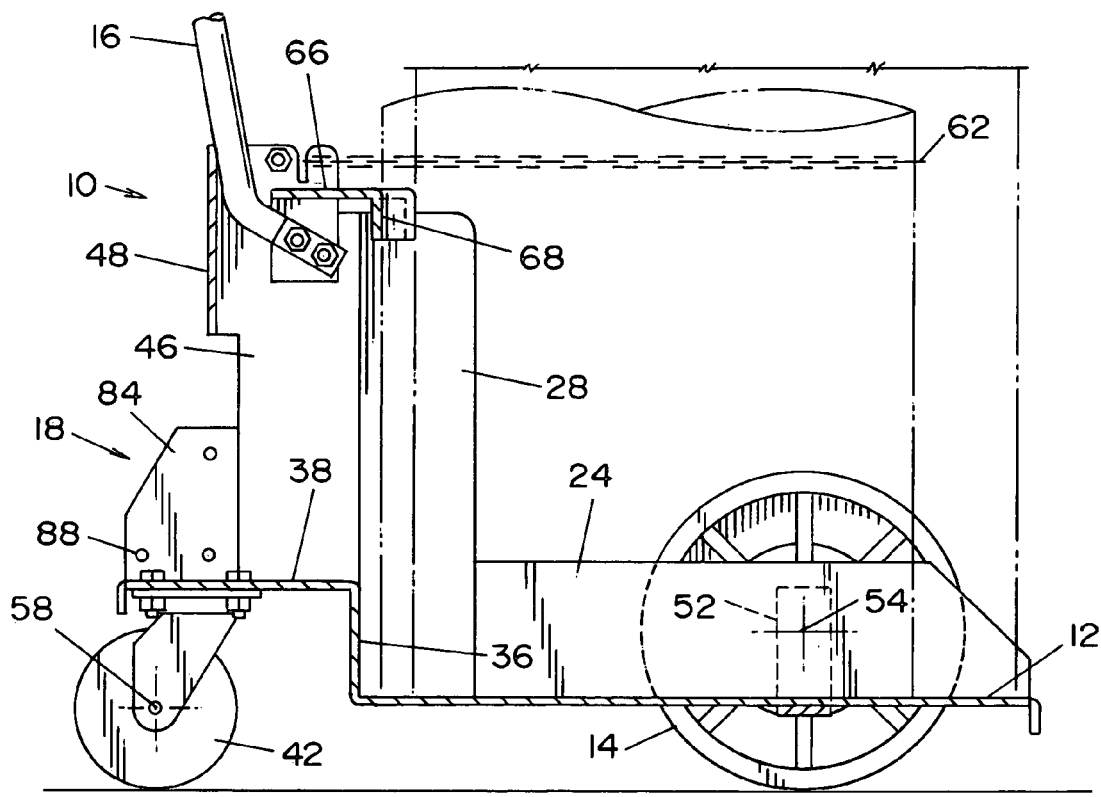

CART FOR WELDING OPERATIONS

BACKGROUND OF THE INVENTION

A problem existed moving large containers of welding wire that are used with portable welding equipment. Known drum carts, such as the cart depicted in FIG. 1, cannot attach to a known welding cart that carries the portable welding equipment. If one person is in charge of moving the portable welding equipment, he first must move the welding cart having the portable welding equipment, such as the welder and the tanks. After moving the welding cart he then must move the wire drum cart.

Movement of the known wire drum cart is difficult because the known wire drum cart does not include a handle nor a restraint system to hold the box or drum in place while moving. Also, the known cart has a small wheel base, which can make the cart unstable. The known wire cart and the known welding cart are also unable to attach to one another.

SUMMARY OF THE INVENTION

A cart for transporting items used in welding operations includes a platform, wheels, a handle and a connector. The platform is dimensioned such that an associated container of welding consumables can rest on the platform. The wheels connect to the platform to facilitate movement of the cart. The handle connects to and extends upwardly from the platform to facilitate maneuvering the cart. The connector allows for selective connecting of the cart to an associated welding cart.

A welding cart includes a frame, wheels connected to the frame, a handle connected to the frame and a coupling station connected to the frame. The wheels facilitate movement of the welding cart. The handle allows a person to maneuver the welding cart. The coupling station allows for the welding cart to selectively attach to a welding consumables cart, such as the cart described above.

BRIEF DESCRIPTION OF THE DRAWINGS

FIG. 1 is a perspective view of a prior art bulk wire cart and a cylinder of bulk wire.

FIG. 2 is a perspective view of a welding consumables cart.

FIG. 4A is a top view of a welding consumables cart having a different configuration as that of FIG. 2 including a support against which a cylinder of bulk wire can rest.

FIG. 4B is a side cross-sectional view of the cart of FIG. 4A taken along line 4B-4B.

DETAILED DESCRIPTION OF THE INVENTION

Figure 3:
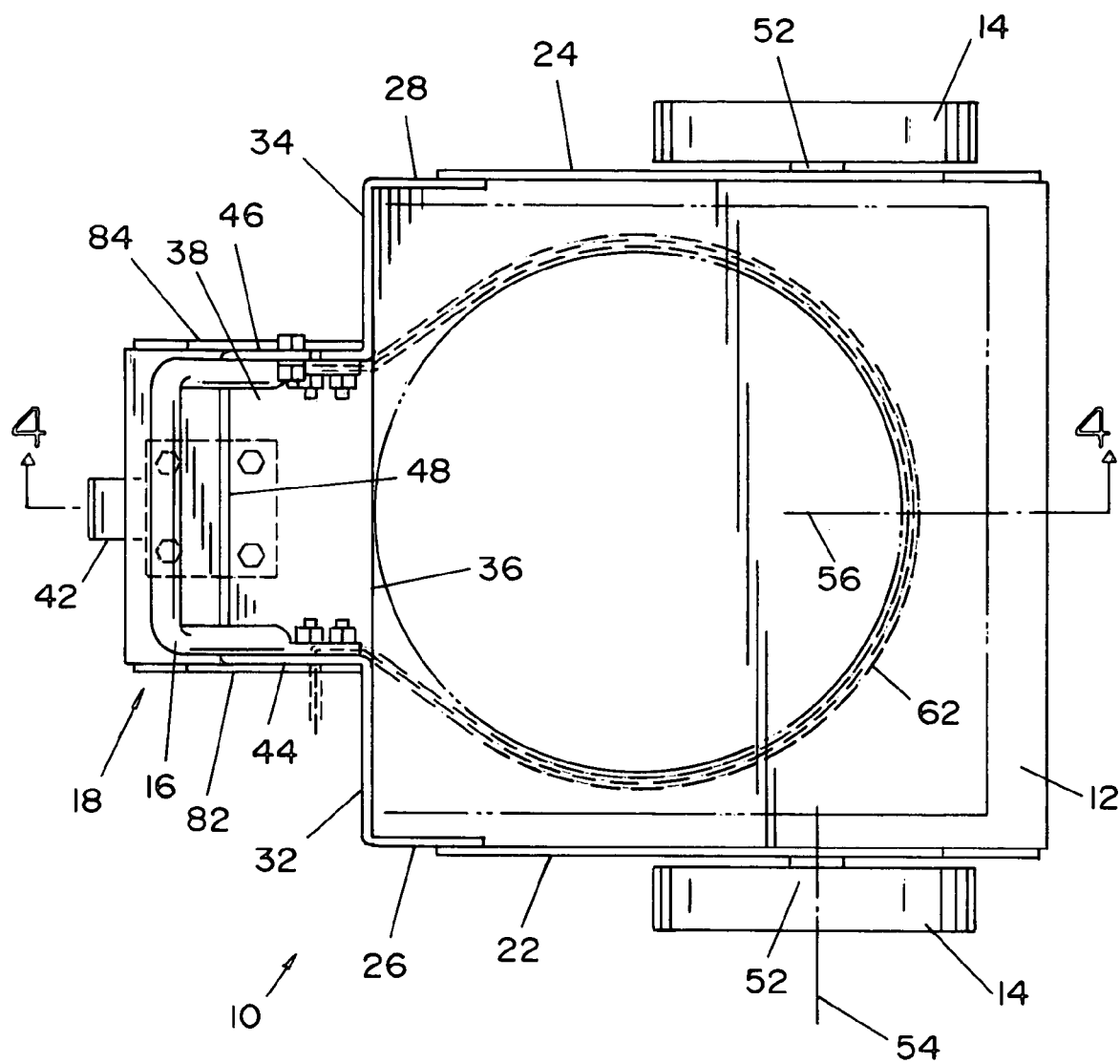
FIG. 3 is a top view of the cart of FIG. 2.

With reference to FIG. 2, a cart for transporting items used in welding operations is disclosed. The cart is useful in transporting welding wire either stored in a bulk wire cylinder, similar to that shown in FIG. 1, or a bulk wire container that has a box-like configuration. Nevertheless, the cart is useful for carrying other items even though it will be described with reference to a welding operation. The welding consumables cart 10 includes a platform 12, wheels 14 connected to the platform, a handle 16 and a hitch 18. The hitch 18 provides a coupling location so that the welding consumables cart can selectively attach to a welding cart.

Figure 4:
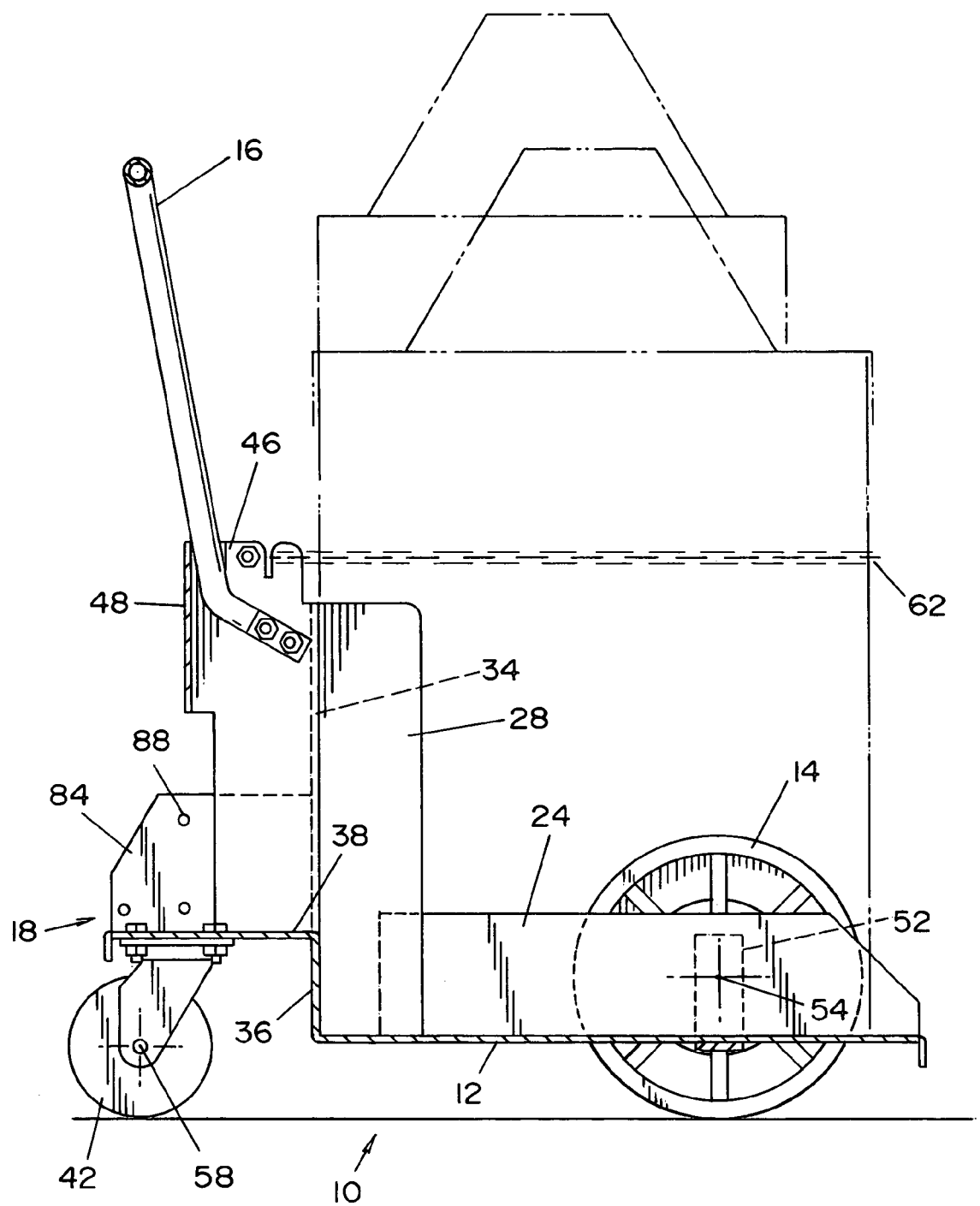
FIG. 4 is a side cross-sectional view of the cart of FIG. 3 taken along line 4-4.

In the embodiment depicted, the platform 12 is generally square-shaped and is dimensioned such that a container of welding consumables, such as welding wire, can rest upon the platform as seen in FIGS. 3 and 4 where containers of welding consumables are shown in phantom. The platform can take other configurations such as polygonal, rectangular or other desirable configurations. The platform, in this embodiment, is made from a durable material such as steel or other durable metal. Nevertheless, the platform can be made of other known durable materials.

As is noticeable from the figures, the welding consumables cart 10 is generally symmetrical in configuration; however, a symmetrical configuration is not necessary. Extending upwardly from and normally to the platform 12, a first lower front side wall 22 extends from a first side edge of the platform and a second lower front side wall 24 extends from a second opposite side of the platform. The lower side walls 22 and 24 extend substantially the entire side length of the platform 12 and include chamfered edges adjacent an open edge of the platform 12. As seen when comparing the cart depicted in FIG. 2 to the prior art cart of FIG. 1, the new welding consumables cart 10 includes an open edge for the platform, i.e., no side wall extends upwardly therefrom, such that a bulk wire container need not be lifted over a side wall. Such a configuration eases loading of the bulk wire container onto the platform of the cart 10 as opposed to the prior art cart where the cylindrical bulk wire must be carefully positioned inside the circular side wall of the cart.

Referring back to FIG. 2, a first higher rearward side wall 26 extends upwardly from and perpendicularly to the platform 12. A second higher rearward side wall 28 also extends upwardly from and perpendicularly to the platform 12. The first higher side wall 26 attaches to or is integral with the first lower side wall 22 and the second higher side wall attaches to or is integral with the second lower side wall 24. The higher side walls are located opposite the open edge of the platform 12. A first rear wall 32 also extends perpendicularly to and upwardly from the platform 12. The first rear wall can be integral with or attaches to the first higher side wall 26 and is perpendicular to the first higher side wall 26. A second rear wall 34 also extends upwardly from and perpendicularly to the platform 12. The second rear wall 34 also attaches to or is integral with the second higher side wall 28 and is perpendicular to the second higher side wall 28. Each rear wall 32 and 34 extends above the platform 12 the same height as the respective higher side wall 26 and 28. A lower central wall 36 interconnects the first rear wall 32 to the second rear wall 34. The lower central rear wall 36 also extends perpendicularly to and upwardly from the platform 12. The lower central rear wall 36 can have a height that is approximately equal to the height of the lower side walls 22 and 24.

A second platform 38 extends rearwardly (away from the open edge of the platform 12) from the lower central rear wall 36 spaced above and parallel to the rear platform 12. With reference to FIG. 4, the second platform 38 can be formed integral with the first platform 12 and the rear wall 36. The second platform 38 provides a mounting surface to which a multidirectional wheel 42, such as a caster wheel, can attach to the cart 10. With reference back to FIG. 2, a first lateral wall 44 extends upwardly from and perpendicularly to the second platform 38 and is integral with or connects to the first rear wall 32. Also, a second lateral wall 46 extends upwardly from and perpendicularly to the second platform 38. The second lateral wall 46 also connects to or is integral with the second rear wall 34. A rear central wall 48 interconnects an upper portion of the first lateral wall 44 to an upper portion of the second lateral wall 46. The rear central wall is spaced from the second platform 38 and provides rigidity to the lateral walls 44 and 46. Even though a configuration of a platform and side walls have been described with particularity, other configurations are available without departing from the scope of the invention. For example, as seen in FIGS. 4A and 4B, the higher rearward side walls 26 and 28 can be angled.

The wheels 14 facilitate movement of the cart 10. With reference to FIG. 4, a wheel support 52 attaches to the platform 12 and the second lower side wall 24 and the wheel 14 attaches to the wheel support. The wheel 14 rotates about an axis 54 that is spaced above the platform 12, which provides more stability to the cart 10 as compared to the prior art cart in FIG. 1 where the wheels rotate about an axis that is below the surface upon which the cylinder of bulk wire rests. Such a configuration lowers the center of gravity of the cart in combination with the bulk wire container thus providing a more stable cart. A second wheel support 52 also attaches to the first lower side wall 22 and the platform 12 and the second wheel 14 attaches to this wheel support. The wheels can mount to the cart 10 in other manners that may obviate the need for the wheel supports. For example, the wheels can attach directly to the side wall.

As mentioned above, a caster wheel 42 mounts to the second platform 38. The caster wheel 42 allows for easy steering of the cart since the caster wheel can rotate about a vertical axis as well as a horizontal axis. As more clearly seen in FIG. 3, the caster wheel 42 is aligned along a central axis 56 of the cart 10 that bisects the axis 54 about which the wheels 14 rotate. Referring to FIG. 4, the caster wheel 42 also rotates about a horizontal axis 58 that is spaced above the surface, e.g., floor, approximately the same distance as the platform 12 is spaced above the surface. Accordingly, the center of gravity of the wire container is lowered so that the cart 10 is more stable than the cart depicted in FIG. 1. The caster wheel 42 is located underneath the handle 16 and spaced from the larger wheels 14.

The handle 16 is provided to maneuver the cart. The handle 16 is a substantially U-shaped member made of hollow cylindrical bar; however, the handle 16 can take other configurations. The handle 16 attaches to the first lateral wall 44 and the second lateral wall 46. The handle 16 is spaced opposite the open edge of the platform 12. Accordingly, a person can lift upward on the handle 16 rotating the platform 12 about the wheel axis 54 and tilting the open edge of the platform 12 toward the ground to facilitate loading a bulk wire container onto the platform.

A chain 62 is provided on the cart 10 to retain the welding wire container placed on the platform 12. As seen in FIG. 2, a key-shaped opening 64 is formed in the first lateral wall 44 to receive the chain 62 after it has been looped around the welding wire container, as seen in FIG. 3. Even though a chain is disclosed, other retaining members such as a flexible cord, a band, rope or other known retaining members can be used to retain the wire container on the platform 12.

With reference to FIGS. 4A and 4B, a support 66 can also be provided on the cart 10 to further support bulk wire containers, especially cylindrical bulk wire containers. The support 66 attaches to the first lateral side wall 44 and the second lateral side wall 46 spaced above the platform 12. The support 66 includes a flange 68 that is complementary in shape to the cylindrical bulk wire container supported on the platform 12. The flange 68 also includes coplanar ends that a box of bulk wire can abut against.

Figure 7:
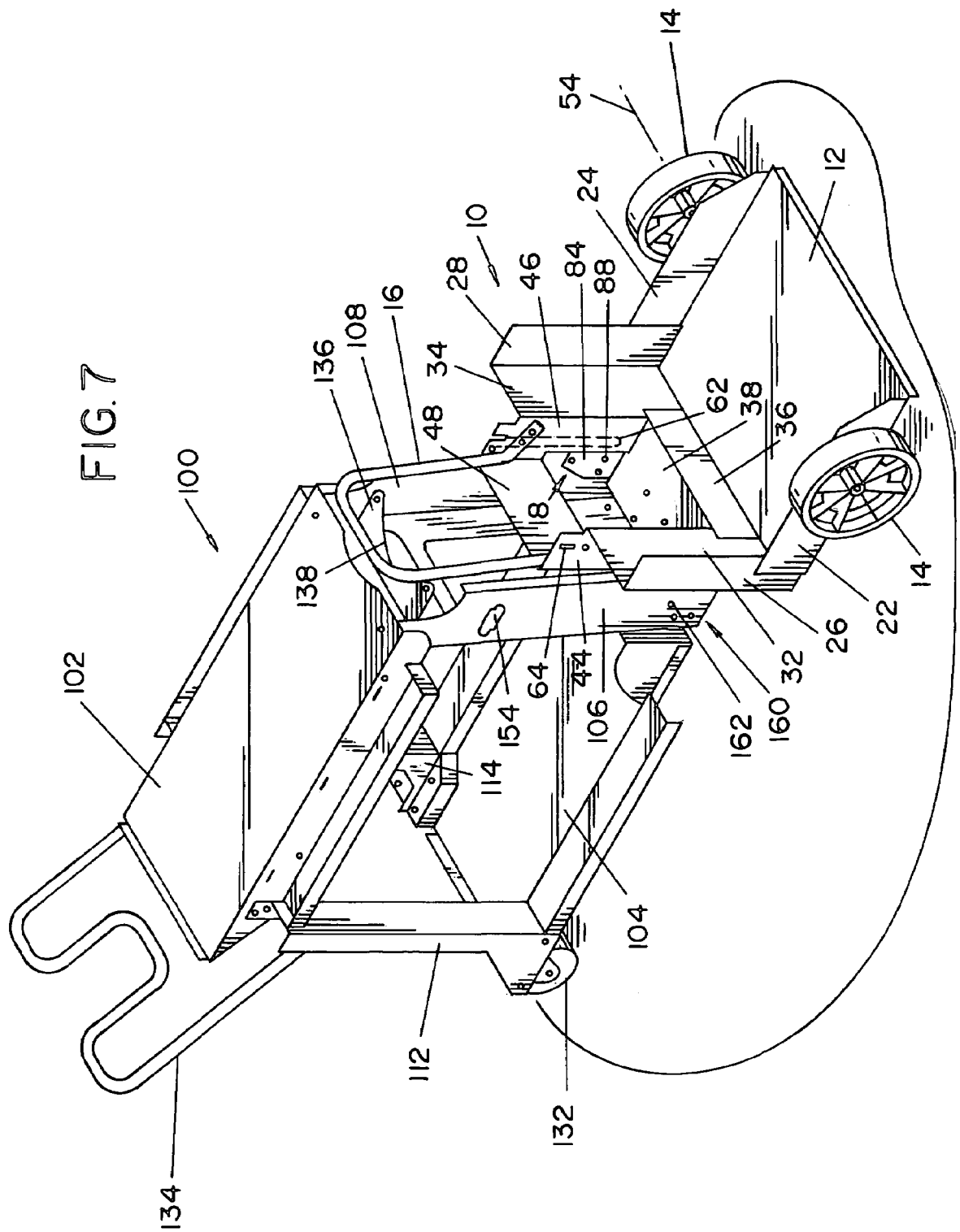
FIG. 7 is a perspective view of the welding cart of FIG. 5 connected to the welding consumables cart depicted in FIG. 2.

The cart 10 also includes a hitch 18 to allow the cart 10 to attach to a welding cart, such as the one shown in FIG. 7. In this embodiment, the hitch is made up of a plurality of components including two plates. A first plate or wall 82 (FIG. 2) extends upwardly from and perpendicularly to the second platform 38 and attaches to the first lateral wall 44. A second plate or wall 84 (FIG. 3) extends perpendicularly to and upwardly from the second platform 38 and attaches to the second lateral wall 46. The first wall 82 and the second wall 84 do not extend as high from the second platform 38 as do the first lateral wall 44 and the second lateral wall 46. Both the first wall 82 and the second wall 84 include a chamfered upper edge located away from the edge that connects to the respective lateral wall 44 and 46. Also, both walls 82 and 84 are spaced inwardly from a lateral edge of the front platform 12. The first wall 82 includes a plurality of openings 86 and the second wall 84 includes a plurality of openings 88 that can receive fasteners to attach the cart 10 to a welding cart, which will be described in more detail below. The walls 82 and 84 are vertically oriented in the depicted embodiment; however, the walls (or plates) can be horizontally oriented or some other configuration.

Figure 5:
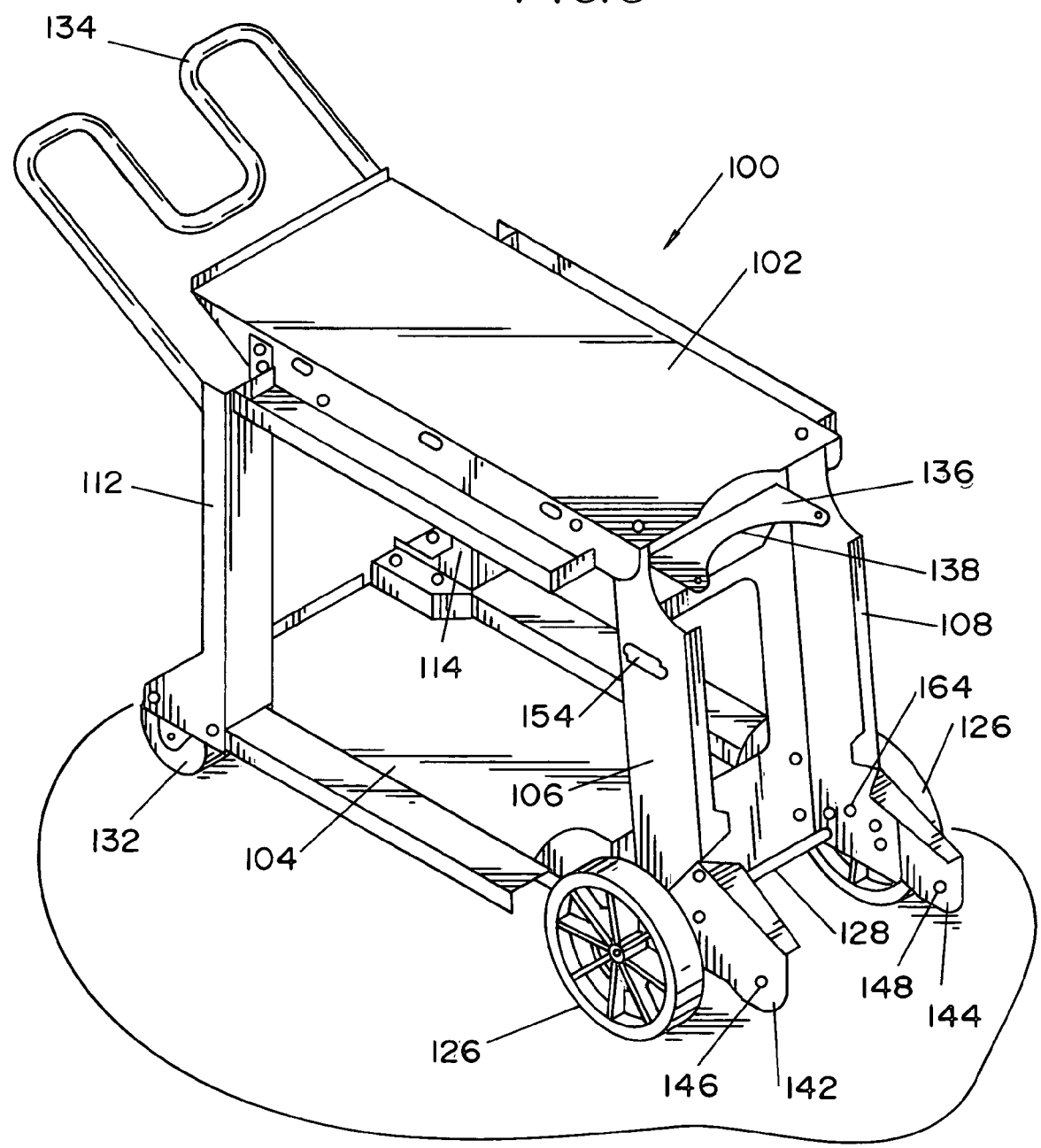
FIG. 5 is a perspective view of a welding cart.

With reference to FIG. 5, a welding cart 100 is shown. The welding cart 100 includes an upper platform 102 and a lower platform 104. A plurality of legs form a frame for the welding cart 100. A first front leg 106 interconnects the upper platform 102 to the lower platform 104 adjacent a corner of each of the platforms. A second front leg 108 also interconnects the first platform 102 to the second platform 104 adjacent corresponding corners. Similarly, a first rear leg 112 interconnects the upper platform 102 to the lower platform 104 and a second rear leg 114 interconnects the platforms 102 and 104.

Figure 6:
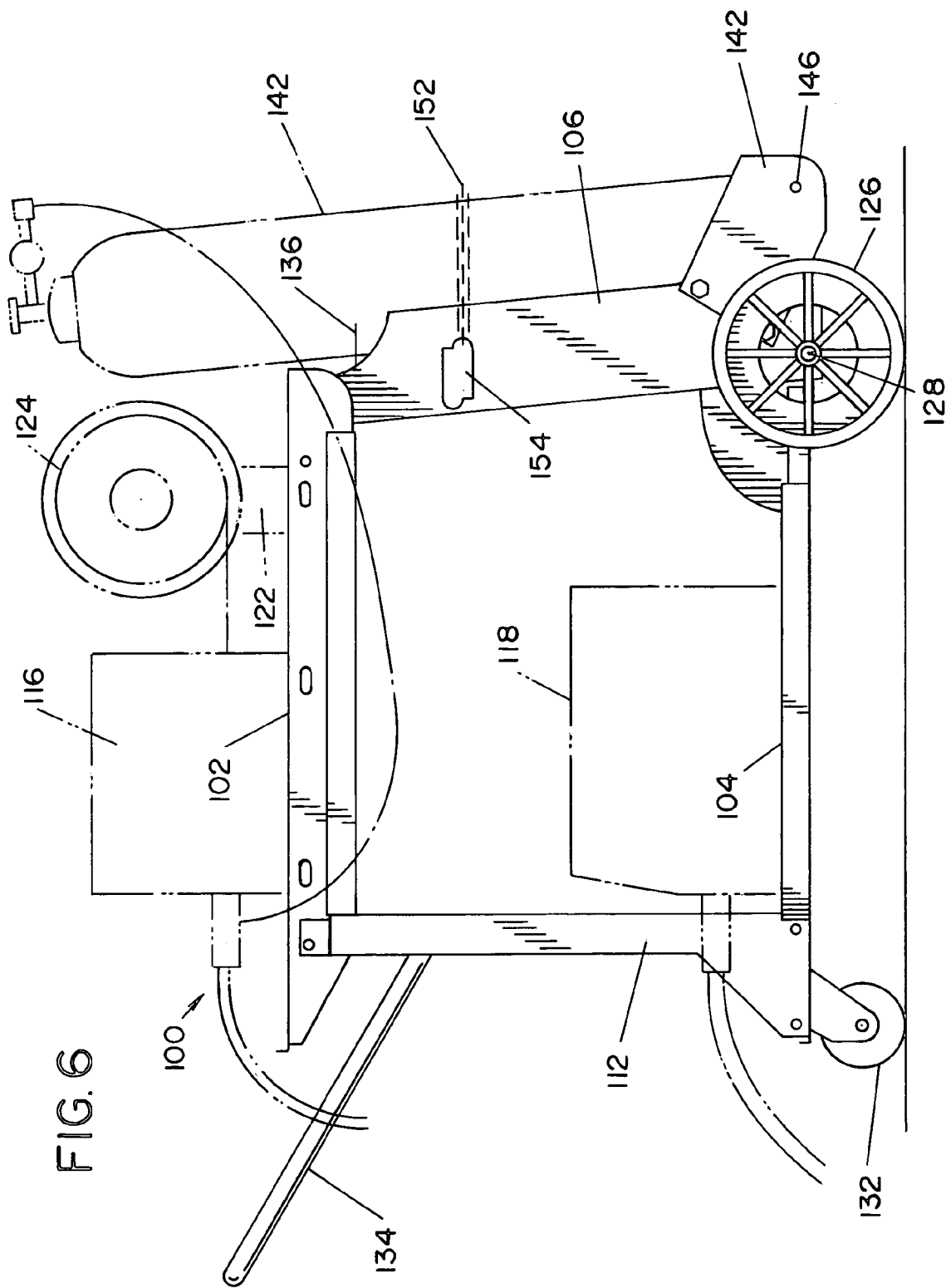
FIG. 6 is a side view of the welding cart of FIG. 5.

As seen in FIG. 6, the upper platform 102 is shaped to accommodate a wire feeder motor 116 and the lower platform 104 is shaped to accommodate a welder 118. A spool support 122 can attach to the cart 100 adjacent the upper platform 102. A spool of welding wire 124 can mount to the spool support 122, and may be desirable when the welding cart 100 is not attached to the welding consumables cart 10.

A plurality of wheels are provided to facilitate movement of the welding cart 100. Front wheels 126 mount to an axle 128 that attaches near the bottom of the front legs 106 and 108. The front wheels 126 are similar to the larger wheels 14.described with reference to the welding consumables cart 10 in that the front wheels 126 rotate only about the axle 128. The front wheels 126 are selectively removable from the axle 128 so that the wheels can easily be removed from the cart 100 to facilitate attachment of the welding cart 100 to the welding consumables cart 10, which will be described in more detail below.

The welding cart 100 also includes rear wheels 132. The rear wheels 132 attach to the cart adjacent the rear legs 112 and 114. The rear wheels 132 in this embodiment are caster wheels; however, wheels similar to the front wheels 126 can be provided.

A handle 134 is provided to maneuver the cart. The handle attaches to the rear legs 112 and 114 opposite the end having the removable wheels 126. The handle shown in this embodiment is shown in a configuration having two distinct handle grip portions; however, the handle can take other configurations including one similar to the handle 16 described with referenced to the welding consumables cart 10.

A tank support 136 extends from the cart 100 below the upper platform 102. The support 136 includes an arcuate edge 138 that is complementary in shape to a conventional tank of gas 142 used in a welding operation. A first lower extension 142 attaches to a lower end of the first front leg 106 and a second lower extension 144 attaches to a lower end of the second front leg 108. The first extension includes a plurality of openings 146 and the second extension includes a plurality of openings 148 to facilitate attachment of a tank platform (not visible). A chain 152 can be provided to retain the tank 142. The chain can attach to the second front leg 108 and an opening 154 can be provided in the first front leg 106 to allow the chain 152 to hook to the front leg 106.

Figure 8:
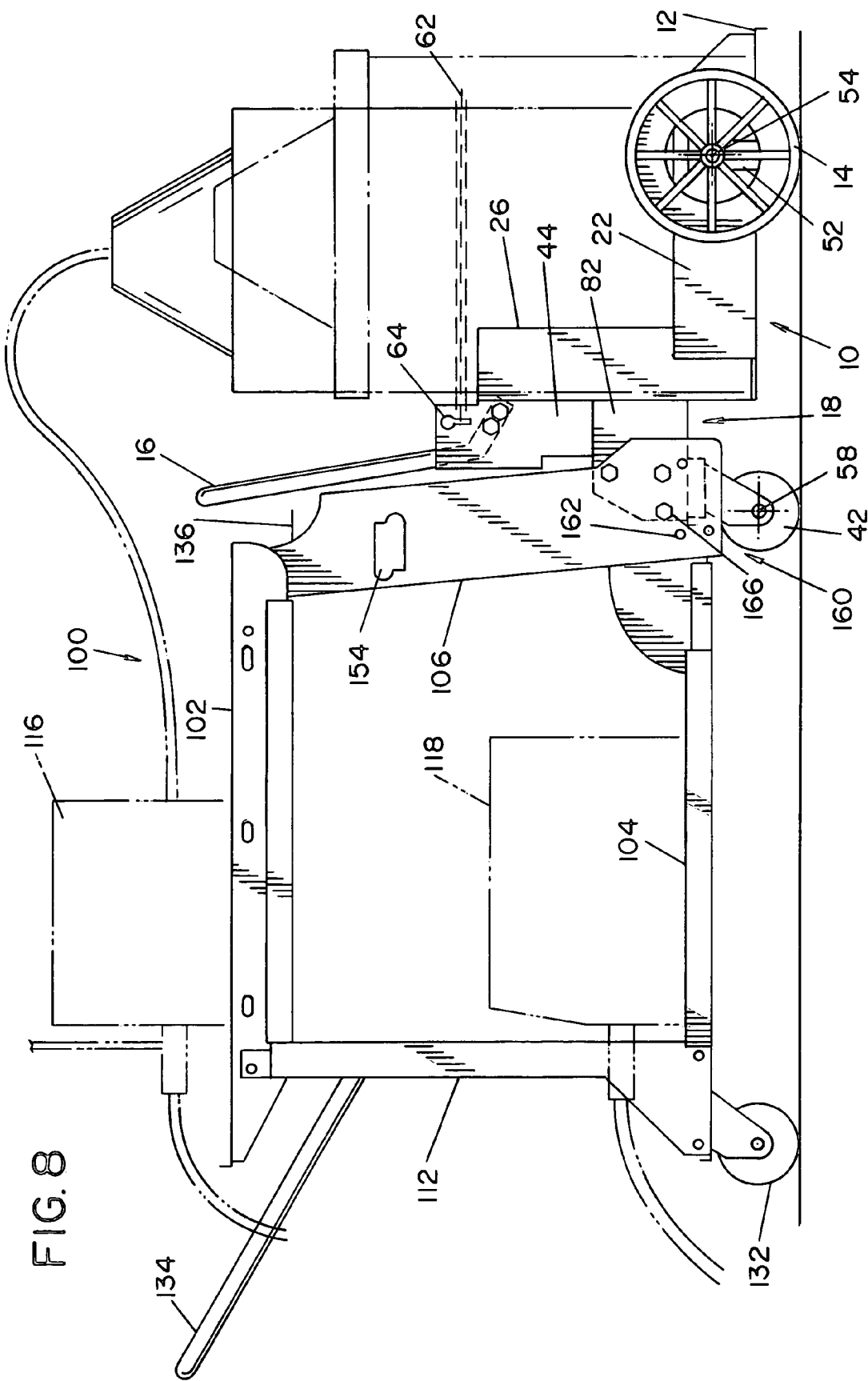
FIG. 8 is a side view of the welding cart and welding consumables cart depicted in FIG. 7.

The welding cart 100 selectively attaches to the welding consumables cart 10 so that the two carts can be maneuvered together as a single unit. The welding cart 100 includes a connection or hitch station 160 to allow the weld cart 100 to selectively connect to the welding consumables cart. With reference to FIG. 8 in comparison to FIGS. 5 and 6, the front wheels 126 and front axle 128 are removed from the front of the cart 100. Also, the first lower extension 142 and the second lower extension 144 are also removed from the first leg 106 and the second leg 108, respectively. The lower end of the first leg 106 includes a plurality of openings 162 that can receive fasteners to attach the first leg 106 to the welding consumables cart 10. With reference back to FIG. 5, the second first leg 108 also includes a plurality of openings 164 that can receive fasteners to connect the second front leg 108 to the welding consumables cart 10. As more clearly seen in FIG. 8, the openings 162 and the first front leg 106 receive bolts or other fasteners 166 that also fit through openings 86 (FIG. 2) in the first wall 82 of the hitch 18 of the welding consumables cart 10. The openings 164 also align with openings 88 in the second wall 84 to receive bolts to attach the second wall 84 to the second leg 108 of the cart 100.

Figure 9:
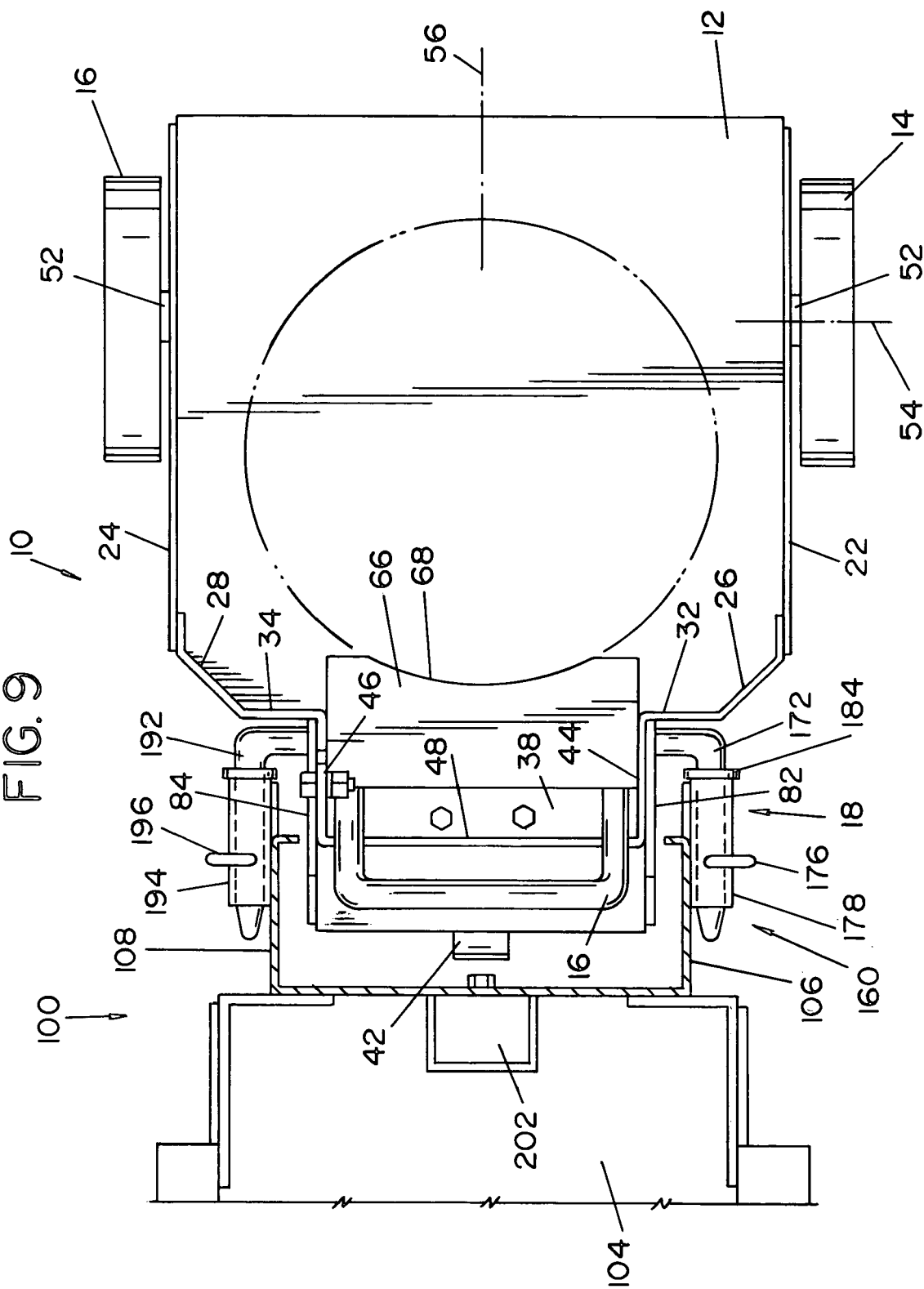
FIG. 9 is a top view of an alternative embodiment showing a connection between a welding cart and a welding consumables cart.

In addition to the connection described above, the welding cart 100 can attach to the welding consumables cart 10 in any other known manner including a clevis pin arrangement. One alternative connection is disclosed in FIGS. 9-11. As seen in FIG. 9, a-first rod or post 172 attaches to the cart 10 adjacent the end having the caster wheel 42. The first rod 172 attaches to the first wall 82 and has a generally L-shaped configuration extending outward from the first wall 82 and then rearward. The rod 172 is circular in cross section; however, it could take other configurations. The rod 172 includes a vertical opening 174 through the rod that is dimensioned to receive a pin 176 to attach the welding cart 100 to the welding consumables cart 10. A cylindrical receptacle 178 is formed at a lower end of the first forward leg 106 and can align with the rod 172 such that the rod 172 can be received in the receptacle 178. The receptacle 178 also includes an opening 182 through which the pin 176 is received such that the rod 172 is fixed inside the receptacle 178. A circular flange 184 is attached to the rod 172 to aid in alignment of the vertical opening 174 in the rod 172 with the vertical opening 182 in the receptacle 178. The rod 172 is inserted into the receptacle 178 until the flange 184 contacts the receptacle, at which time the openings 174 and 182 are aligned. With reference to FIG. 9, a second rod 192 is positioned on an opposite side of the cart 10. The second rod is received in a second receptacle 194 that is positioned on an opposite side of the welding cart 100 as the first receptacle 178. A pin 196 fits through openings formed in the rod 192 and the receptacle 194 similar to that described above. In an alternative embodiment, the location of the pins and receptacles can be reversed so that the pins extend from the welding cart 100 and the receptacles extend from the welding consumables cart 10.

Figure 10:
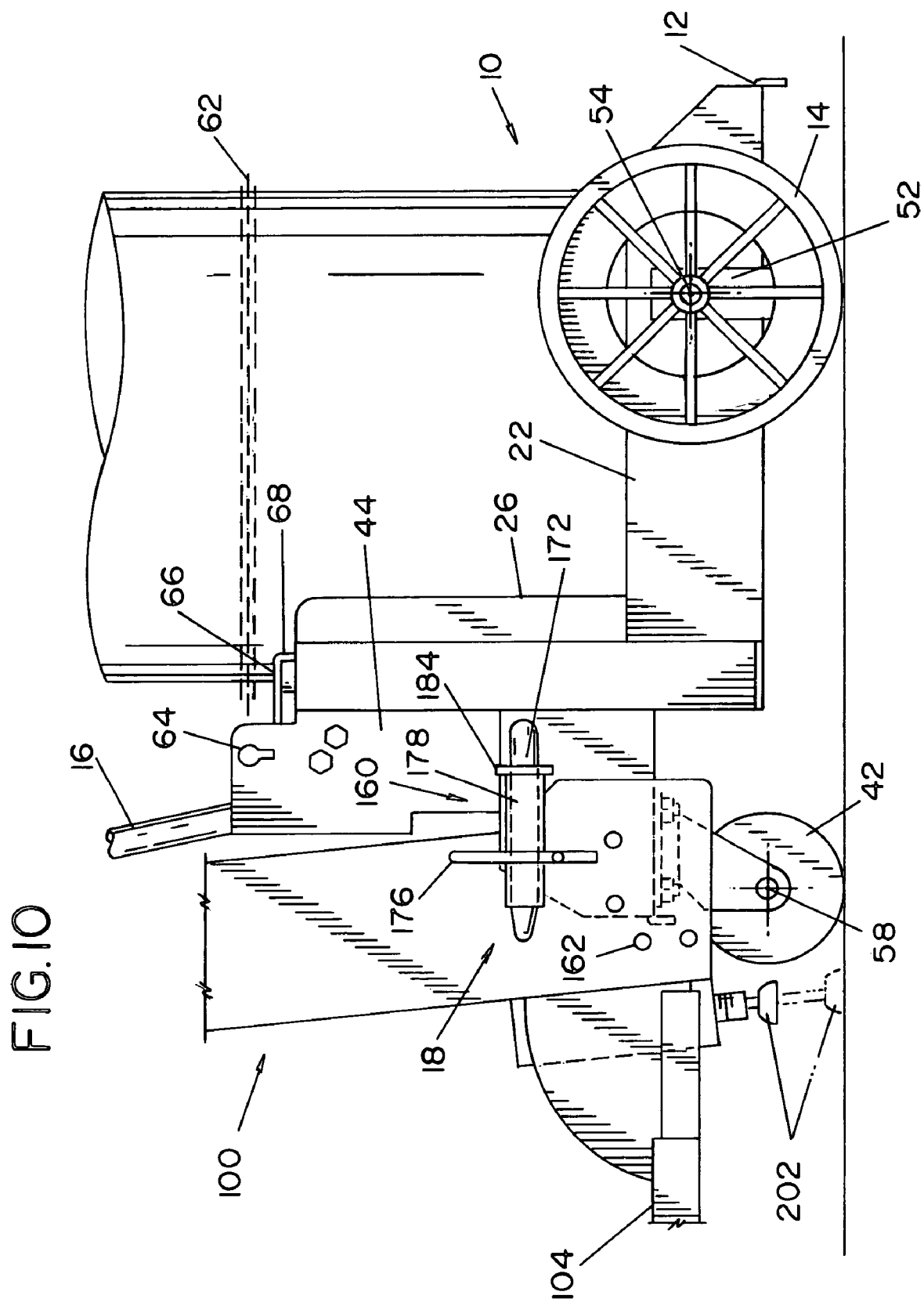
FIG. 10 is a side view of the connection shown in FIG. 9.
Figure 11:
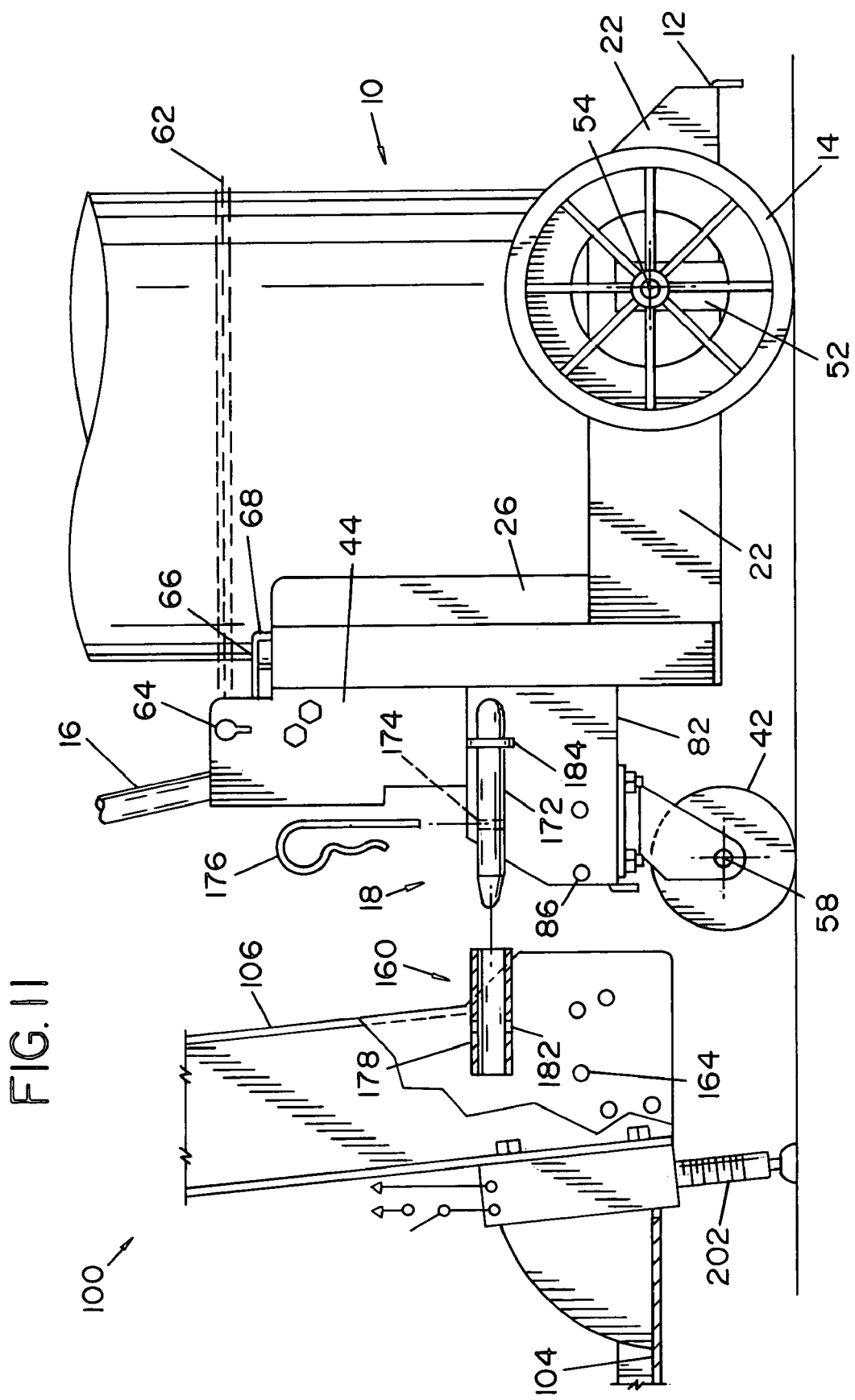
FIG. 11 is a side view of the welding cart removed from the welding consumables cart with the connections shown in FIGS. 9 and 10.

With reference to FIGS. 10 and 11, a kick stand 202 can also be provided on the welding cart 100. The kick stand can move vertically linearly up and down to support the welding cart 100 when the front wheel 126 had been removed from the cart 100. In an alternative embodiment, the kickstand can pivot, similar to a kickstand for a bike, between a retracted and extended position. With the kickstand in the extended position the rods 172 and 192 align with the receptacles 178 and 194. The above described connections between the welding cart 100 and the welding consumables cart 10 are somewhat rigid in that the connection does not allow the welding cart to pivot in relation to the welding consumables cart. Accordingly, the carts, when attached to one another, can be maneuvered easily with the handle 134 of the welding cart 100. As seen in FIG. 7, the handle 16 of the welding consumables cart 10 can also be located in relation to the welding cart 100 to limit rotational movement of the welding consumables cart 10 in relation to the welding cart 100 in that the handle 16 can contact the welding cart 100 if the cart begins to rotate. Nevertheless, it is contemplated that the welding cart 100 could attach to the welding consumables cart 10 via a hinged or pivoting connection.

A welding cart and a welding consumables cart have been described with reference to certain embodiments. Modifications and alterations will occur to those skilled in the art upon reading and understanding the preceding detailed description. The preceding detailed description is provided to enable a person skilled in the art to make and use the subject carts, while also setting forth the best mode contemplated by the inventor. The specification is not meant to limit the invention, which is defined by the appended claims and the equivalents thereof.

The invention claimed is:

1. A cart for transporting an associated container of welding consumables used in welding operations, the cart comprising:
    a platform upon which the associated container of welding consumables can rest;
    a first wheel connected to the platform;
    a second wheel connected to the platform and spaced from the first wheel, wherein the first wheel and the second wheel facilitate movement of the cart;
    a handle connected to the platform adjacent a first end of the platform, the handle extending above the platform;
    a hitch disposed adjacent the first end of the platform and adapted to provide for selective connection of the cart to an associated welding cart;
    a wheel support connected to the platform, wherein the wheel support includes a connection surface that is substantially parallel with the platform; and
    a caster wheel attached to the wheel support.

2. The cart of claim 1, wherein the platform is polygonal.

3. The cart of claim 2, wherein the platform is rectangular.

4. The cart of claim 1, further comprising a third wheel, wherein the first wheel is positioned on a first side of the platform and the second wheel is positioned on a second side of the platform, the first side being opposite the second side.

5. The cart of claim 4, wherein the first wheel and the second wheel are aligned with and rotate about a first axis spaced vertically above the platform.

6. The cart of claim 5, wherein the third wheel is spaced from the first axis and is positioned along a second axis that is perpendicular to the first axis.

7. The cart of claim 6, wherein the second axis bisects the first axis.

8. The cart of claim 7, wherein the third wheel comprises a caster wheel.

9. The cart of claim 7, wherein the third wheel rotates about at least two axes that are perpendicular to one another.

10. The cart of claim 1, wherein the second wheel comprises a caster wheel.

11. The cart of claim 1, further comprising a first side wall extending upwardly from a first side of the platform and a second side wall extending upwardly from a second side of the platform, the first side being opposite the second side.

12. The cart of claim 11, further comprising a third side wall extending upwardly from the first side of the platform and a fourth side wall extending upwardly from the second side of the platform, wherein the third and fourth side wall both extend above the first and second side wall.

13. The cart of claim 12, wherein the platform includes an open edge adjacent the first side and the second side wall wherein the open edge has no wall extending upwardly therefrom.

14. The cart of claim 13, further comprising a fifth wall extending upwardly from the platform adjacent to and at a right angle with the third side wall, and a sixth wall extending upwardly from the platform adjacent to and at a right angle with the fourth side wall.

15. The cart of claim 14, wherein the fifth wall and the sixth wall are spaced from one another.

16. The cart of claim 14, wherein the fifth wall and the sixth wall reside in the same plane.

17. The cart of claim 14, further comprising a support interposed between the fifth wall and the sixth wall, wherein the support includes an arcuate surface that faces toward the platform.

18. The cart of claim 15, further comprising a retaining member attached to one of the fifth and sixth wall, the retaining member being long enough to surround a box or drum of welding consumables that rests on the platform and engage a hook located on one of the fifth and sixth wall, wherein the retaining member comprises a chain, a flexible cord, a band or some combination thereof.

19. The cart of claim 14, further comprising a seventh wall adjacent to and perpendicular with the fifth wall and an eighth wall adjacent to and perpendicular with the sixth wall.

20. The cart of claim 19, wherein the handle comprises a U-shaped member that attaches to the seventh wall and the eighth wall.

21. The cart of claim 1, wherein the hitch comprises a plate including a plurality of openings to receive fasteners to attach the cart to the associated welding cart.

22. The cart of claim 1, wherein the hitch comprises at least two plates, each plate including a plurality of openings to receive fasteners to attach the cart to the associated welding cart.

23. The cart of claim 22, wherein each plate is spaced toward an inner portion of the platform.

24. The cart of claim 1, wherein the hitch comprises a pair of plates that are spaced from and parallel to one another.

25. The cart of claim 24, wherein the plates each include an opening for receiving a fastener to attach the cart to the associated welding cart.

26. The cart of claim 1, further comprising a caster wheel connected to the platform and disposed adjacent the first end of the platform.

27. The cart of claim 1, further comprising walls extending upwardly from the platform and the handle being attached to at least one of the walls.

28. The cart of claim 1, further comprising a wheel support attached to the platform and the first wheel being attached to the wheel support.

29. The cart of claim 1, wherein the first and second wheels rotate about a first axis and the caster wheel is spaced from the first axis.

30. In combination, a welding cart and a welding consumables cart, the combination comprising:
the welding cart comprising a frame, a welding cart wheel connected to the frame, a welding cart handle disposed at or adjacent a first end of the frame and a coupling station connected to the frame and spaced from the first end, wherein the coupling station includes cylindrical receptacles adapted to receive a clevis pin,
the welding consumables cart comprising a platform upon which the associated container of welding consumables can rest, a first welding consumables cart wheel connected to the platform, a second welding consumables cart wheel connected to the platform and spaced from the first welding consumables cart wheel, wherein the first welding consumables cart wheel and the second welding consumables cart wheel facilitate movement of the welding consumables cart, a welding consumables cart handle connected to the platform adjacent a first end of the platform, the welding consumables cart handle extending above the platform, and a hitch disposed adjacent the first end of the platform and adapted to provide for selective connection of the cart to an associated welding cart.

31. The combination of claim 30, wherein one of the coupling station and the hitch defines a receptacle and the other of the coupling station and the hitch comprises a fastener selectively received by the receptacle.

32. The combination of claim 31, wherein the fastener comprises a clevis pin.

33. The combination of claim 30, wherein the welding consumables cart further comprises a side wall extending upwardly from the platform.

34. The combination of claim 33, further comprising a chain that attaches to the side wall and is adapted to retain an associated box or drum of welding consumables resting on the platform.

35. The combination of claim 30, wherein the welding cart further comprises a selectively movable stand adjacent the coupling station.

36. The combination of claim 35, wherein the selectively movable stand moves linearly in a generally vertical direction.

37. The combination of claim 35, wherein the stand is rotatable between an extended position and a retracted position.

38. The combination of claim 30, wherein the welding cart includes a first platform attached to the frame for supporting an associated welder and a second platform attached to the frame and spaced above the first platform for supporting an associated wire feeder motor.

39. The combination of claim 38, wherein the welding cart includes a selectively removable wheel connected to the frame adjacent an end of the frame to which the coupling station is connected.

40. The combination of claim 39, wherein the welding cart includes a movable stand adjacent the end of the frame to which the coupling station is connected.

41. The combination of claim 40, wherein the welding consumables cart further comprises a caster wheel connected to the frame disposed adjacent the hitch of the welding consumables cart.

42. The combination of claim 39, wherein the coupling station includes openings spaced above the selectively removable wheel.

43. In combination, a welding cart and a welding consumables cart, the combination comprising:
the welding cart comprising a frame, a welding cart wheel connected to the frame, a welding cart handle disposed at or adjacent a first end of the frame and a coupling station connected to the frame and spaced from the first end,
the welding consumables cart comprising a platform, welding consumables cart wheels connected to the platform to facilitate movement of the welding consumables cart, a welding consumables cart handle connected to and extending above the platform, and a hitch connected with the platform and configured to provide for selective connection of the welding consumables cart to the welding cart,
wherein the coupling station is configured to cooperate with the hitch such that the welding cart can selectively attach to the welding consumables cart, and the coupling station comprises a first plate having openings for receiving fasteners to attach the welding cart to the welding consumables cart.

44. The combination of claim 43, wherein the coupling station of the welding cart comprises a second plate having openings for receiving fasteners to attach the welding cart to the welding consumables cart, wherein the second plate is spaced from the first plate.

45. The combination of claim 44, wherein the hitch of the welding consumables cart comprises a first plate that cooperates with the first plate of the welding cart and a second plate that cooperates with the second plate of the welding cart.

46. The combination of claim 43, wherein the hitch of the welding consumables cart comprises a first plate having openings that align with the openings in the first plate of the coupling station of the welding cart, wherein the openings receive fasteners to attach the welding cart to the welding consumables cart.

47. In combination, a welding cart and a welding consumables cart, the combination comprising:
the welding cart comprising a frame, a welding cart wheel connected to the frame, a welding cart handle disposed at or adjacent a first end of the frame and a coupling station connected to the frame and spaced from the first end,
the welding consumables cart comprising a platform, welding consumables cart wheels connected to the platform to facilitate movement of the welding consumables cart, a welding consumables cart handle connected to and extending above the platform, and a hitch connected with the platform and configured to provide for selective connection of the welding consumables cart to the welding cart,
wherein the coupling station is configured to cooperate with the hitch such that the welding cart can selectively attach to the welding consumables cart and the coupling station is disposed adjacent a second end of the frame, the second end being opposite the first end, and
wherein both the coupling station and the hitch are adapted to attach to one another to inhibit rotation of the welding cart about a vertical axis in relation to the welding consumables cart.

48. The combination of claim 47, wherein the welding consumables cart handle is connected to the platform adjacent an end of the platform to which the hitch is adjacent.

49. In combination, a welding cart and a welding consumables cart, the combination comprising:
the welding cart comprising a frame, a welding cart wheel connected to the frame, a welding cart handle disposed at or adjacent a first end of the frame and a coupling station connected to the frame and spaced from the first end,
the welding consumables cart comprising a platform, welding consumables cart wheels connected to the platform to facilitate movement of the welding consumables cart, a welding consumables cart handle connected to and extending above the platform, and a hitch connected with the platform and configured to provide for selective connection of the welding consumables cart to the welding cart,
wherein the coupling station is configured to cooperate with the hitch such that the welding cart can selectively attach to the welding consumables cart, and the coupling station includes two connection areas horizontally spaced from one another so as to inhibit rotational movement of the welding cart in relation to the welding consumables cart.

* * * * *